(12) United States Patent
Berchtold et al.

(10) Patent No.: US 7,958,718 B1
(45) Date of Patent: Jun. 14, 2011

(54) PRECISION CONTROLLED VARIABLE THRUST SOLID PROPELLANT ROCKET MOTOR

(75) Inventors: L. Don Berchtold, Brigham City, UT (US); Ralph S. Tappan, Brigham City, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

(21) Appl. No.: 07/376,813

(22) Filed: Jul. 7, 1989

(51) Int. Cl.
*B63H 11/00* (2006.01)
(52) U.S. Cl. .......... 60/204; 244/3.22; 102/374; 60/229
(58) Field of Classification Search ............. 60/229, 60/253, 254, 225, 233, 204, 256; 244/3.22; 102/374, 381
See application file for complete search history.

(56) References Cited

U.S. PATENT DOCUMENTS

| | | | | |
|---|---|---|---|---|
| 2,856,851 A | * | 10/1958 | Thomas | 102/374 |
| 3,044,255 A | * | 7/1962 | Precoul | 60/253 |
| 3,274,772 A | * | 9/1966 | Hawkins et al. | 60/225 |
| 3,688,636 A | * | 9/1972 | Spiess et al. | 102/381 |
| 3,712,058 A | * | 1/1973 | Cooper | 102/381 |
| 4,223,606 A | * | 9/1980 | Bornstein | 102/374 |
| 4,817,377 A | * | 4/1989 | Kirschner, Jr. et al. | 60/225 |
| 4,840,024 A | * | 6/1989 | McDonald | 60/225 |

\* cited by examiner

*Primary Examiner* — Christopher P Ellis
(74) *Attorney, Agent, or Firm* — TraskBritt

(57) ABSTRACT

A multiple-stage solid rocket motor is operated in a manner designed to control its mass discharge profile. This is accomplished by providing means for igniting one stage and then igniting a subsequent stage while the first continues to burn.

6 Claims, 4 Drawing Sheets

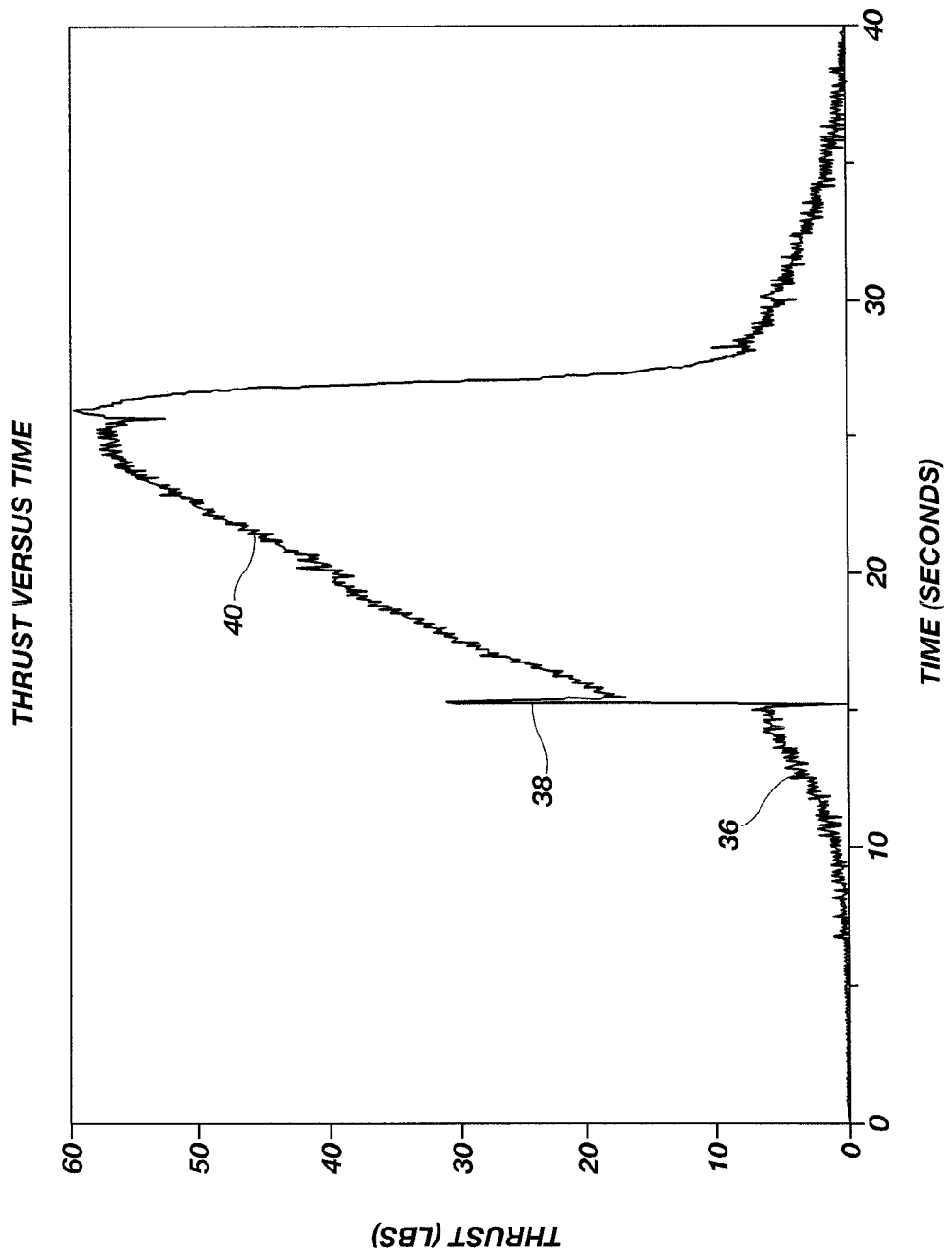

PRECISION CONTROLLED VARIABLE THRUST SOLID PROPELLANT ROCKET MOTOR

The United States government has rights in this invention pursuant to Subcontract No. AW59564A under Prime Contract No. F04704-86-C-0169 awarded by the United States Air Force.

TECHNICAL FIELD

This invention relates to multi-stage solid propellant rocket motors. More particularly, it relates to method and apparatus for operating such motors.

BACKGROUND OF THE INVENTION

The entire propulsive capacity of solid propellant rocket motors is usually spent during the combustion process of one mass of solid propellant. This is for the reason that, once a solid propellant is ignited, it is very difficult to stop the combustion process until the entire mass of ignited propellant has been consumed.

It is known to provide a solid propellant rocket motor with the ability to fire more than once. Such a rocket motor with a "start-stop-restart" capability is commonly called a "pulsed" rocket motor. It includes, within the same case, two or more solid propellant units, such as a boost grain and a sustain grain, separated by a membrane seal structure that enables the ignition of the propellant units to be independent of each other. In this manner, discreet impulses are available upon command. Quite often, the solid propellant units are positioned in tandem with each other; that is, with one solid propellant unit, or grain, forward of the other. Normally, the aft unit will burn to completion before the forward unit is ignited. However, neither the prior art nor this invention is limited to only two stages, but may include any number of tandem stages sequentially ignited.

This invention relates primarily to relatively small solid propellant powered missiles that are fired from a "bus" such as a larger missile or an airplane. For example, a large missile carrying up to 50 or more decoys (simulating reentry vehicles for example) may be surface-launched. Each decoy may be a solid propellant powered rocket that will be launched from the bus toward a specific target. In this manner, all of the decoys when launched will simulate an attack on a plurality of targets. It then becomes difficult for an enemy to distinguish between decoys and actual warheads. In order to simulate actual warheads, it is necessary to be able to control: (a) bus release time; (b) the angle of attack; (c) the velocity changes of the missile as it enters the Earth's atmosphere; and (d) other factors such as radar image. It is often desirable to control the signature profile of the plume, as well as the thrust profile. The term "mass discharge profile," as used herein, includes both.

A bus may launch these smaller missiles over a lengthy portion of its flight path. These flight path portions may have widely varying velocities, directions of movement, locations, and elevations. Furthermore, the actual flight path of the bus may vary somewhat from the planned flight path. All of these factors must be taken into account to achieve the desired trajectory and velocity for each of the decoy missiles. Furthermore, the desired trajectory and velocity may differ for each decoy.

As previously explained, rocket motors powered by solid propellant grains have an important limitation. This is that, once ignited, each grain burns to completion. In the prior art, missiles with multiple-stage motors are known, but the stages are either ignited simultaneously or each stage is ignited after prior stage combustion is completed (so-called "pulse" motors).

It is, therefore, an object of the present invention to provide a multiple-stage solid propellant rocket motor wherein preselected thrust, velocity, and trajectory are achievable with a given mass of propellant.

Another object is to provide such a motor wherein the variable factors may be preset prior to launch of the missile from the bus.

Another object is to provide such a motor wherein the variable factors may be preset prior to launch of the bus vehicle.

Other objects, features, and advantages will become apparent from the following description and appended claims.

DISCLOSURE OF INVENTION

The invention comprises method and apparatus for controlling a rocket having a plurality of solid propellant motor grains, each ignited by its own igniter. The grains are ignited so that there is overlap in combustion. After ignition of a first stage, ignition of subsequent stages is timed to achieve a desired mass flow pattern. For example, the second grain may be ignited at any time beginning with first-stage ignition through burnout of the first stage. The combustion products from both stages exhaust through the same nozzle. Simultaneous ignition creates maximum initial thrust and velocity and matches the steepest entry angles. Delayed ignition of the second and subsequent stages minimizes initial thrust and matches the shallow reentry angle.

BRIEF DESCRIPTION OF DRAWINGS

FIG. 4 is a diagram of thrust versus time achieved in an actual test of the method of the invention.

BEST MODE FOR CARRYING OUT THE INVENTION

Figure 1:
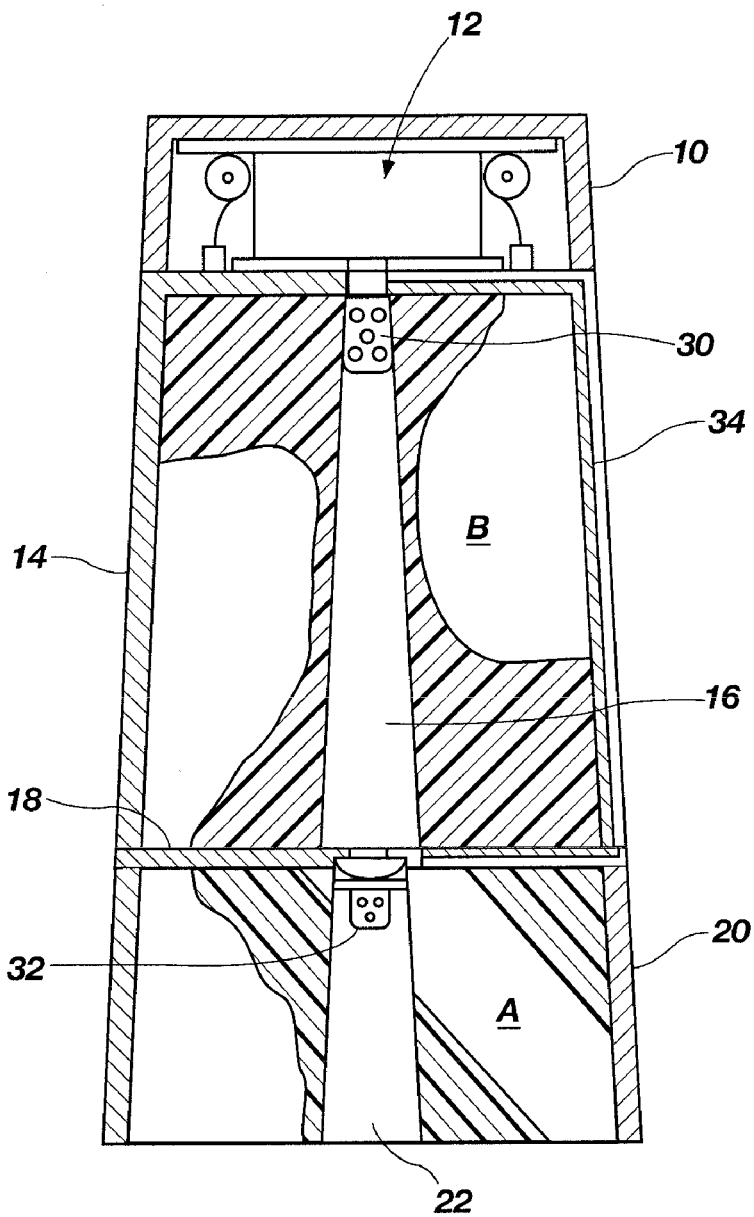
FIG. 1 is a vertical cross-section of a two-stage solid propellant rocket motor in accordance with this invention, with the outer housing and nozzle omitted.

With particular reference to FIG. 1, there is illustrated a two-stage solid propellant rocket motor assembly in accordance with the present invention. It comprises an upper housing 10, within which is mounted initiator controller circuitry 12 described below.

The upper housing 10 is mounted on a second-stage housing 14 that contains the second-stage propellant grain B, which has a hollow central core 16. The bottom end of the second-stage housing 14 is closed by an intermediate bulkhead 18. The bulkhead 18 rests upon first-stage housing 20 that contains the first-stage propellant in grain A, which also has a central hollow core 22. A central aperture in the intermediate bulkhead 18 carries a blowout plug 26. The rocket body and nozzle are not illustrated. The nozzle serves as the closure for grain A. An inhibitor is employed on the end of grain B.

Mounted within the upper end of the hollow core 16 of second-stage grain B is an igniter 30, which is connected for energization by the initiator controller circuitry 12 in the upper housing 10. A second, consumable, igniter 32 is mounted in the upper end of the first-stage propellant grain A and is also connected to be energized by the initiator controller circuitry 12 by means of wires running through a suitable raceway 34 provided in the second-stage housing 14.

The objectives of this invention are achieved by igniting the second-stage grain B during the combustion of the first-stage grain A. By proper selection of ignition timing, selection of grain size, and rapidity of grain combustion, the thrust profile may be readily shaped to provide the desired conditions.

For example, FIG. 4 is a curve showing the thrust in pounds versus the time in seconds for a two-stage solid propellant rocket motor operated in accordance with the invention. The initial area 36 of the curve illustrates the increasing thrust provided by the first-stage grain A. At slightly more than 15 seconds into the burn, spike 38 signals ignition of the second-stage grain B. The combined thrust provided by both grains is reflected in the curve's intermediate area 40. It will be obvious that, by proper selection of grain shapes and sizes, coupled with control of the ignition time of the second grain relative to the first, a substantial degree of control over the thrust profile can be achieved. As will be appreciated by those skilled in the art, this is a significantly different result than can be achieved by the conventional prior art technique of simply pulse firing successive stages following the burnout of preceding stages.

Figure 2:
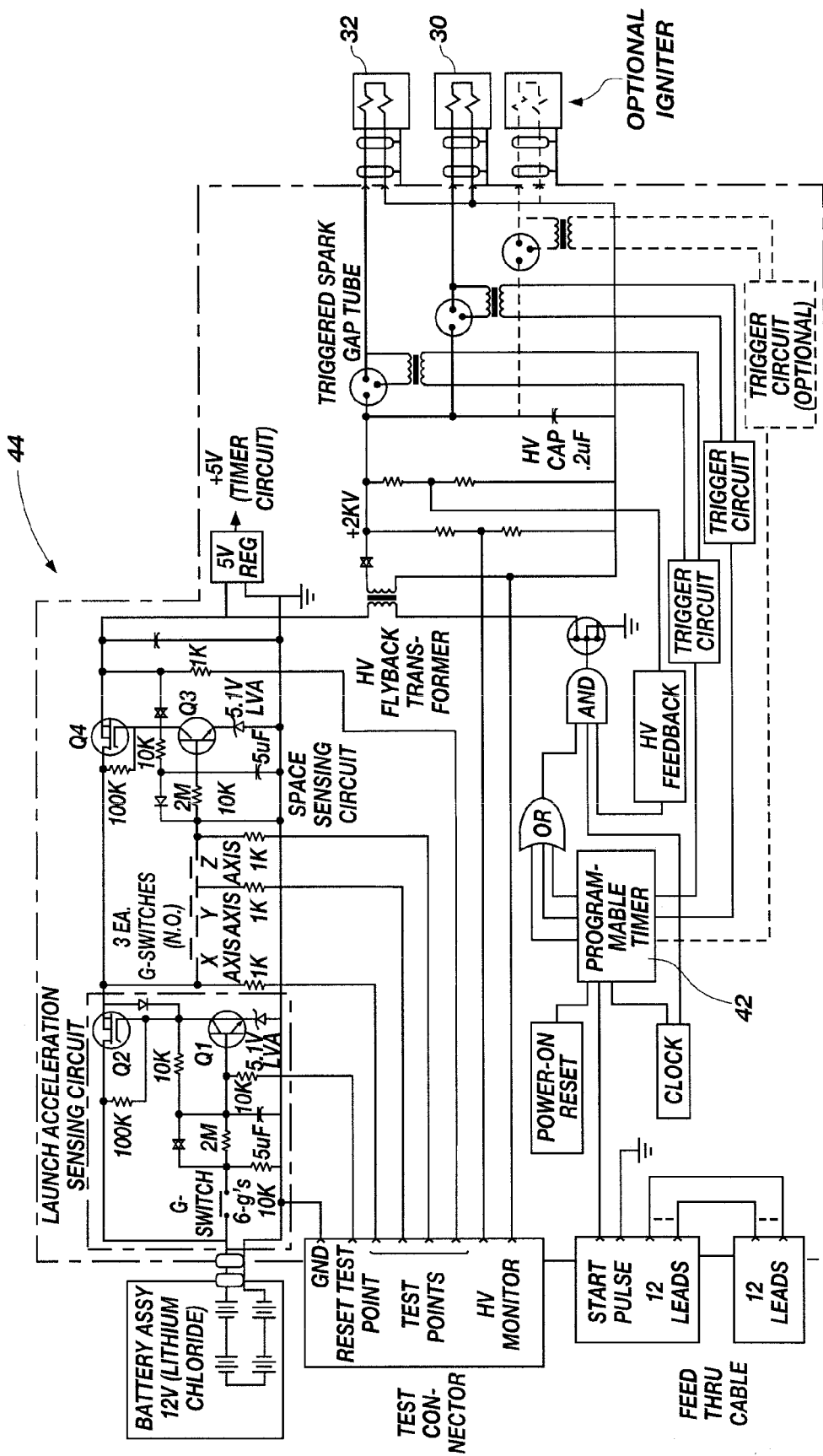
FIG. 2 is a schematic diagram of an igniter and controller circuit usable with the present invention.

FIG. 2 is a schematic diagram of a controller circuit for igniting the first-stage igniter 32 and the second-stage igniter 30. In this circuit a programmable timer 42 is preset to fire the stages within each decoy missile. It includes a sensing circuit 44 for sensing the launch and arming the system.

Figure 3:
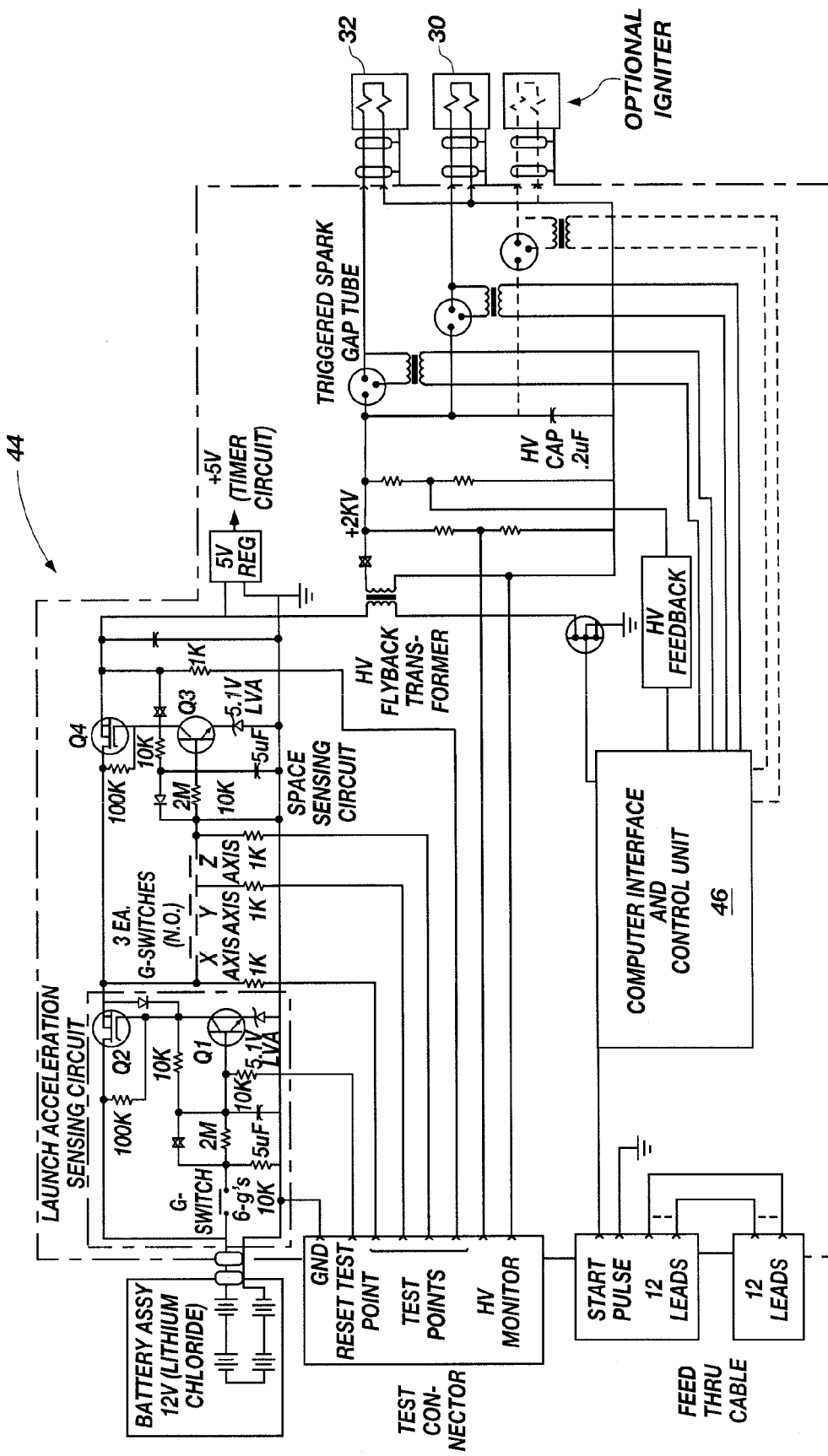
FIG. 3 is a schematic diagram similar to that of FIG. 2 but including a computer controlled timing system.

FIG. 3 illustrates a slightly different embodiment of the circuit of FIG. 2 wherein stage ignition timing within each decoy is established from actual flight conditions and preset just before kickoff of the decoy. This version includes a computer interface and control unit 46 that includes timers, triggers and resets. It accepts information from the bus and transmits signals to the programmable timer 42.

It is believed that the many advantages of this invention will now be apparent to those skilled in the art. It will also be apparent that a number of variations and modifications may be made in this invention without departing from its spirit and scope. For example, the specific circuits for timing the ignition of the stages may be substantially altered or replaced by other ignition timing arrangements. Also, as previously explained, the invention is not limited to two-stage motors, or even to first- and second-stage control. Rather, it is applicable to ignition of any two successive stages in any number of a multiplicity of stages of a motor to be controlled. Accordingly the foregoing description is to be construed as illustrative only, rather than limiting. This invention is limited only by the scope of the following claims.

The invention claimed is:

1. A method of controlling the mass discharge profile of a solid propellant rocket motor mounted within a missile carried by, and separable from, a bus and having a plurality of tandemly positioned propellant grains, each comprising a different stage which burns to completion following ignition, which comprises:
   igniting a first of said propellant grains; and
   controllably igniting a second of said propellant grains while a substantial portion of the first propellant grain remains to burn, the time of the second ignition relative to the first ignition being preselected during the flight of the bus based upon flight conditions of the bus;
   whereby said mass discharge profile includes a portion representative of the combined thrust of the first and second grains.

2. The method of claim 1, wherein the bus flight conditions are its trajectory.

3. Apparatus for controlling the mass discharge profile of a solid propellant rocket motor mounted within a missile carried by, and separable from, a bus and having a plurality of tandemly positioned propellant grains, each comprising a different stage which burns to completion following ignition, which comprises:
   means for igniting a first of said propellant grains: and
   means responsive to the flight conditions of the bus for selecting the time of ignition of a second of said propellant grains at a time when a substantial portion of the first propellant grain remains to burn;
   whereby said mass discharge profile includes a portion representative of the combined thrust of the first and second grains.

4. The apparatus of claim 3, wherein the bus flight conditions are its trajectory.

5. In a solid propellant rocket motor mounted within a missile carried by, and separable from, a bus and having a plurality of tandemly positioned propellant grains, each comprising a different stage which burns to completion following ignition, the improvement which comprises:
   means responsive to the flight conditions of the bus for selecting the time of ignition of a second of said propellant grains at a time when a substantial portion of a preignited first propellant grain remains to burn.

6. The improvement of claim 5, wherein the bus flight conditions are its trajectory.

* * * * *